United States Patent [19]

Ladin

[11] Patent Number: 4,482,041
[45] Date of Patent: Nov. 13, 1984

[54] SELF-ALIGNING CLUTCH RELEASE BEARING ASSEMBLY WITH LUBRICATION RESERVOIR

[75] Inventor: Eli M. Ladin, Ann Arbor, Mich.
[73] Assignee: Federal-Mogul Corporation, Southfield, Mich.
[21] Appl. No.: 330,130
[22] Filed: Dec. 14, 1981
[51] Int. Cl.³ ............... F16D 13/74; F16D 23/14
[52] U.S. Cl. ............... 192/98; 192/110 B; 192/113 R; 384/612
[58] Field of Search ............... 192/98, 110 B, 70.12, 192/113 R; 308/5 R, 233

[56] References Cited

U.S. PATENT DOCUMENTS

| | | | |
|---|---|---|---|
| 1,606,127 | 11/1926 | Kolb | 192/98 X |
| 1,668,668 | 5/1928 | Beemer | 192/98 X |
| 1,912,101 | 5/1933 | Short | 192/98 X |
| 1,922,645 | 8/1933 | Tower | 192/113 R X |
| 1,965,325 | 7/1934 | Tower | 192/110 B X |
| 2,278,663 | 4/1942 | Loeffler et al. | 308/5 R X |
| 2,380,327 | 7/1945 | Parsons | 308/233 |
| 3,104,746 | 9/1963 | Gadd et al. | 192/98 X |
| 3,815,715 | 6/1974 | Maucher | 192/98 |
| 3,882,979 | 5/1975 | Limbacher et al. | 192/98 |
| 3,985,215 | 10/1976 | Ernest et al. | 192/98 |
| 4,033,440 | 7/1977 | Ladin | 192/98 |
| 4,080,019 | 3/1978 | Flaissier et al. | 192/98 X |
| 4,117,917 | 10/1978 | Ladin et al. | 192/98 |
| 4,243,130 | 1/1981 | Vinel et al. | 192/98 |
| 4,327,951 | 5/1982 | Arrowsmith et al. | 192/110 B X |

FOREIGN PATENT DOCUMENTS

| | | | |
|---|---|---|---|
| 385039 | 12/1932 | United Kingdom | 192/110 B |
| 437052 | 10/1935 | United Kingdom | 192/110 B |

*Primary Examiner*—Rodney H. Bonck
*Attorney, Agent, or Firm*—Robert F. Hess

[57] ABSTRACT

A clutch release bearing assembly is described in which a lubrication reservoir is provided between the bearing and the bearing carrier. The lubricant in this reservoir is communicable through a plurality of passageways in the bearing carrier to lubricate the reciprocable movement of the bearing carrier with respect to a guide member connected with the transmission. The bearing assembly is formed to provide a predetermined radial clearance between the bearing and bearing carrier which permits the bearing to shift radially with respect to the bearing carrier, so that the bearing may coaxially align itself with a clutch input shaft axis, said shifting being operative to transfer lubricant from the reservoir to the area between the bearing carrier and guide member.

5 Claims, 3 Drawing Figures

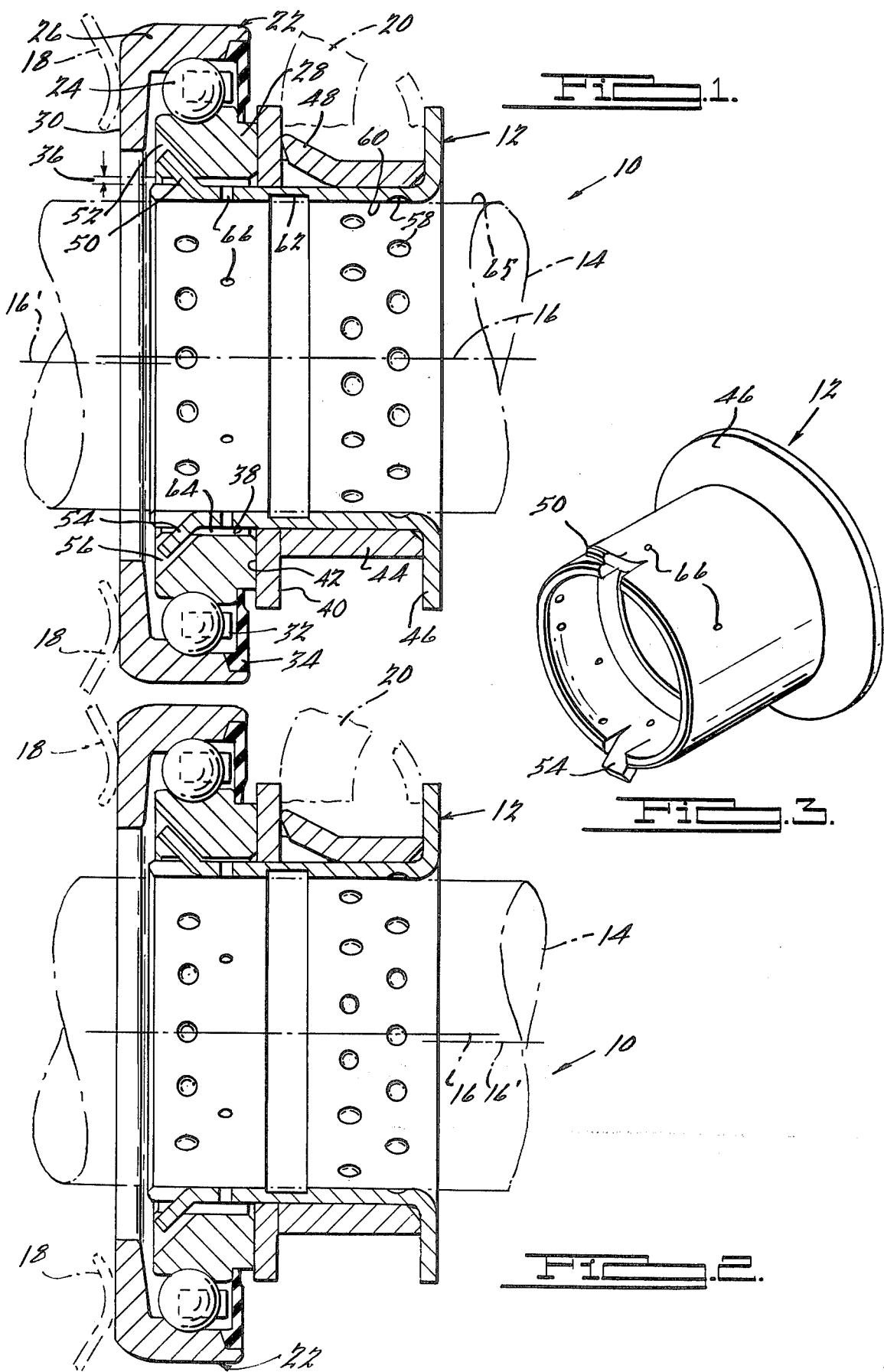

4,482,041

SELF-ALIGNING CLUTCH RELEASE BEARING ASSEMBLY WITH LUBRICATION RESERVOIR

BACKGROUND AND SUMMARY OF THE INVENTION

The present invention relates generally to bearing assemblies, and particularly to self-aligning clutch release bearing assemblies in automobile friction disc clutches.

This application is related to my copending U.S. patent application Ser. No. 342,255, filed Jan. 25, 1982 and entitled "A Self-Aligning Clutch Release Bearing Assembly," which is hereby incorporated by reference. This application is also generally related to copending U.S. patent application Ser. No. 321,010, entitled "A Springless Self-Aligning Clutch Release Bearing Assembly," filed Nov. 13, 1981 and assigned to the same assignee as the present invention.

Every time the clutch pedal is depressed, the associated actuating fork causes the clutch release bearing assembly to slide along a guide member and actuate the clutch via engagement with release fingers or levers rotating about the axis of an input shaft. When the clutch pedal is subsequently released, the clutch release bearing assembly again slides along the guide member back to its original position. In order to minimize wear resulting from the repeated reciprocation of the release bearing, it is desirable to provide means for maintaining the engaging surfaces lubricated.

Accordingly, it is an object of the present invention to provide a novel clutch release bearing assembly having a lubricant reservoir which is capable of gradually supplying a lubricant to the area between the bearing assembly and guide member.

The clutch release bearing assembly includes and is movably supported on a tubular bearing carrier member having a plurality of radial passages which communicate with the reservoir and operate to conduct lubricant to the area between the carrier member and guide member. As will be seen, the clutch release bearing assembly includes a bearing located with a predetermined radial clearance relative to the carrier member. The latter clearance defines the lubricant reservoir such that relative radial movement of the bearing with respect to the carrier member will create a pumping action operative to displace a portion of the stored lubricant through the passages in the carrier member to periodically replenish the lubricant between the carrier member and guide member.

As will be seen, the clutch release bearing assembly is of the self-alignment type and hence the act of alignment itself (being a radial displacement) will provide the desired pumping action. Therefore, it is another object of the present invention to provide a self-aligning bearing assembly having a lubricant reservoir actuable in response to alignment action.

Additional features and advantages of the invention will become apparent in view of the drawings and the following detailed description of the preferred embodiment.

BRIEF DESCRIPTION OF THE DRAWINGS

FIG. 1 is a cross-sectional view of a self-aligning clutch release bearing assembly according to the present invention showing the associated bearing in a position before it has moved into alignment with the rotational axis of the input shaft;

FIG. 2 is a cross-sectional view of the bearing assembly of FIG. 1 with the associated bearing shown in an aligned position; and FIG. 3 is a perspective view of a bearing carrier forming a part of the bearing assembly of FIGS. 1 and 2.

DETAILED DESCRIPTION OF THE PREFERRED EMBODIMENT

Referring to FIG. 1, a self-aligning clutch release bearing assembly 10 in accordance with the present invention is shown, and is adapted for use with a conventional clutch assembly the details of which have been omitted for simplicity. Typically the clutch assembly has an input side connected to an engine crankshaft (not shown) and an output side connected to a transmission (not shown). As shown in FIGS. 1 and 2, the associated clutch assembly is represented as having an input axis of rotation 16'. Release bearing assembly 10 includes a tubular bearing carrier 12 adapted to be axially slidably mounted to a tubular guide member to quill 14 (shown in phantom). Typically the quill has a central axis 16 and is connected to and projects forwardly from the transmission. Conventionally the transmission has a transmission shaft extending through the quill 14 for connection with the output side of the clutch assembly.

Frequently the central axis 16 of guide member 14 will be slightly out of alignment or eccentric with respect to the input axis of rotation 16' of the clutch assembly and hence will locate the axis of the clutch release bearing 10 out of alignment. As will be seen the clutch release bearing assembly 10 is of the self-aligning type whereby the axis of rotation of its associated bearing will automatically be brought into alignment with the input axis of rotation 16'.

The clutch assembly includes clutch release lever means 18 (partially shown and in phantom) which rotate about axis 16'. A clutch actuating fork means 20 (partially shown and in phantom) straddles bearing carrier 12 and is actuable to axially move the clutch release bearing assembly 10. A further description of a typical friction disc clutch may be found in assignee's U.S. Pat. No. 4,033,440, issued July 5, 1977, entitled "Self-Aligning Clutch Bearing Assembly," the disclosure of which is hereby incorporated by reference.

Bearing assembly 10 includes a bearing 22 which comprises a plurality of anti-friction ball elements 24 interposed between an outer race member 26 adapted for rotation and an inner race member 28 adapted to be fixed from rotation. The bearing 22 is of the type capable of withstanding axial thrust loads imposed thereon. Rotatable race member 26 includes an annular radially extending contact surface 30 positioned so as to engage the clutch release levers 18. In the construction as shown, the clutch release levers 18 are designed to continuously engage surface 30 of bearing 22. A cage circumferentially spaces balls 24, while a resilient, elastomeric annular seal element 34 is secured to outer race member 26.

Bearing 22 is disposed substantially coaxially around bearing carrier 12 between clutch release levers 18 and clutch actuating fork 20, and is formed to provide a predetermined annular, radial clearance 36 between the inner race member 28 and a generally axially extending surface 38 of the bearing carrier 12. Radial clearance 36 permits bearing 22 to shift sufficiently radially with respect to bearing carrier surface 38 and axis 16, so that the bearing may coaxially align itself with the clutch input shaft axis 16' under the dynamic force exerted on the bearing 22 by the clutch release levers 18. With the bearing 22 coaxially aligned with the input shaft axis 16', the continuous or constant engagement of the clutch release levers 18 with the radially extending contact surface 30 of the outer race member 26 will tend to hold the bearing 22 in this desired radial attitude (as shown in FIG. 2) even when the clutch is not being actuated.

It should be understood that the alignment of the bearing 22 with the clutch input shaft axis 16' is dynamic in character and a number of transient forces may act upon the bearing assembly to cause temporary misalignments. For example, vibration or shock loading may cause the bearing 22 to slip slightly out of alignment. Additionally, misalignment may occur during the translational movement of the bearing assembly 10 along the guide member 14, such as when the clutch pedal is manually depressed or released. Depending upon how closely the bearing carrier 12 is fitted over the guide member 14, the pivotal movement of the actuating fork 20 during clutch actuation may cause the bearing carrier 12 to move in such a manner as to result in a momentary misalignment between the bearing 22 and the clutch input axis 16'. Nevertheless, the engagement between the rotating clutch release levers 18 and the bearing 22 will provide the force required for the bearing 22 to readily realign itself with the clutch input axis 16'.

A radially extending thrust washer 40, is coaxially supported with a close fit on the axially extending bearing carrier surface 38 adjacent to and engaging the nonrotatable inner race member 28 of the bearing 22. Thrust washer 40 is used to maintain bearing 22 in a generally vertical attitude with respect to axis 16' and provides a bearing surface 42 against which the inner race member 28 may readily slide when bearing 22 shifts radially to align itself with the clutch input shaft axis 16'. However, it should be understood that this function may alternatively be provided by suitably shaping actuating fork 20. A tubular collar 44 is positioned in a press fit relationship with surface 38 of bearing carrier 12 between the thrust washer 40 and a radially projecting flange portion 46 of the bearing carrier 12. Collar 44 serves to axially position bearing 22 and thrust washer 40 along the bearing carrier 12.

Bearing assembly 10 is also provided with means for preventing the rotation of the bearing carrier 12 and the inner race member 28 of the bearing 22. This anti-rotation means includes a generally radially outwardly projecting tab 48 formed in the collar 44 for coacting or interlocking with clutch actuating fork 20 to block the rotation of the bearing carrier 12. The anti-rotation means further includes at least one outwardly projecting tab 50 formed in the bearing carrier 12, and at least one notch 52 formed in the inner race member 28 for receiving the bearing carrier tab 50. Since the rotation of the bearing carrier 12 is prevented as described above, the bearing carrier tab 50 and the inner race member notch 52 cooperate or interlock to prevent the rotation of the inner race member 28. In one form of the present invention, an additional bearing carrier tab 54 and inner race member notch 56 are provided, and are preferably disposed diametrically from tab 50 and notch 52 respectively.

Bearing carrier 12 is also formed with a plurality of radially outwardly projecting indentations 58 disposed circumferentially about an interior axially extending bearing carrier surface 60 for providing pockets between the bearing carrier and the guide member or quill 14. The indentations 58 can be filled with a suitable lubricant for lubricating the reciprocable movement of the bearing assembly 10 along the guide member 14. For the same purpose, bearing carrier 12 is further formed with an annular groove 62 for holding a supply of this lubricant.

In addition to the supply of lubricant provided by annular groove 62, the annular volume defined by clearance 36 is also filled with lubricant providing at least in part an additional reservoir 64 for ensuring an ample supply of lubricant. In order to conduct this lubricant to the interior surface 60 of the carrier member 12 and an exterior surface 65 of the quill 14, a plurality of spaced generally radially extending passageways 66 are provided in carrier member 12 and positioned so as to communicate with clearance 36. As the bearing 22 shifts radially with respect to the bearing carrier 12 to align itself with the input shaft rotational axis 16', a portion of the lubricant will be forced from the reservoir 64 through one or more of the passageways 66 by a pumping or squeezing action. This may be visualized with reference to FIG. 2, which illustrates the bearing 22 of bearing assembly 10 in an aligned position with the clutch input shaft axis 16'. Specifically, bearing 22 has shifted radially downwardly, decreasing the radial clearance 36 between the inner race member 28 and the bearing carrier 12 on the upper side as shown. It will be appreciated that during alignment the decreasing radial clearance at the upper side will apply pressure to the lubricant contained in reservoir 64, forcing a portion of the lubricant through at least one of the passageways 66 at the top. This pumping may be repeated each time bearing 22 moves out of and into alignment with the clutch input shaft axis, thereby providing a supply of additional lubricant to the interior surface 60 of the bearing carrier 12 and the exterior surface 65 of the quill 14. Additionally, as noted above, there may be radial movement resulting from clutch actuation and/or the transient forces which may also be operative to pump additional lubricant as needed. The lubricant in the reservoir 66 may also gradually diffuse or migrate through the bearing carrier passageways 66 to further supplement the lubrication film on the interior surface 60 of the bearing carrier 12 and the exterior surface 65 of the quill 14.

In addition to reservoir 64 providing an additional supply of reserve lubricant, the lubricant contained therein also acts to dampen any noise producing vibration of the bearing 22 with respect to the bearing carrier 12, thereby aiding in relatively quiet operation of the bearing assembly 10.

Alternatively, a conventional elastomeric sponge saturated with the lubricant may be inserted into reservoir 64 to provide a supply of lubricant and to dampen vibration.

The lubricant may be any suitable oil or grease with a sufficient viscosity to provide a predetermined resistance to fluid flow. This resistance to fluid flow should be such as to provide a controlled transfer of the lubricant from the reservoir 64 through the passageways 66; suitable greases that have the necessary tenacity or stickiness are those greases having a general viscosity range of 70–85 SUS at 210° F., such as the Phillips Petroleum Co. LUBRIKO M24M or PHILUBE MW grease.

It should be understood that various changes and modifications may be made to the preferred embodiment without departing from the spirit and scope of the invention as defined by the appended claims.

What is claimed is:

1. An improved self-aligning clutch release bearing assembly for a friction clutch in a vehicle power train having release lever means rotatable about an input shaft axis of said clutch, a guide member disposed generally coaxially around a transmission shaft axis of said power train and actuating means, comprising:

a tubular bearing carrier slidably mounted on said guide member for reciprocable, translational movement therealong in response to actuation of said actuating means, said tubular member having a plurality of generally radial passageways extending therethrough intermediate the ends thereof;

a bearing including a plurality of anti-friction elements interposed between radially spaced inner and outer race members, one of said race members being adapted for rotation and having an annular radially extending bearing surface for engaging said clutch release lever means;

said bearing being radially moveably supported on said bearing carrier in overlying relationship to said passageways and axially located between said release lever means and said actuating means;

said bearing being formed to provide a predetermined radial clearance between said bearing and an axially extending surface of said bearing carrier for permitting said bearing to shift radially with respect to said bearing carrier, so that said bearing may coaxially align itself with said clutch input axis; and a lubrication reservoir defined in part by said predetermined radial clearance, and having a lubricant contained therein, said radial shifting of said bearing being operative to transfer lubricant through said passageways to said guide member.

2. The self-aligning clutch release bearing assembly according to claim 1, wherein said lubricant also gradually diffuses from said lubrication reservoir through said passageways to lubricate said reciprocable movement of said bearing carrier with respect to said guide member.

3. The self-aligning clutch release bearing assembly according to claim 1, wherein said lubricant acts to dampen vibration of said bearing with respect to said bearing carrier.

4. The self-aligning clutch release bearing assembly according to claim 1, wherein said lubricant is a grease having a sufficient viscosity to provide a predetermined resistance to fluid flow so as to provide a controlled flow of lubricant through said passageways.

5. The self-aligning clutch release bearing assembly according to claim 4 wherein said lubricant has a viscosity in the range of 70–85 SUS at 210° F.

* * * * *